A. C. KLEMME.
AUTOMOBILE HOIST.
APPLICATION FILED MAR. 24, 1917.
1,233,793.
Patented July 17, 1917.
2 SHEETS—SHEET 2.
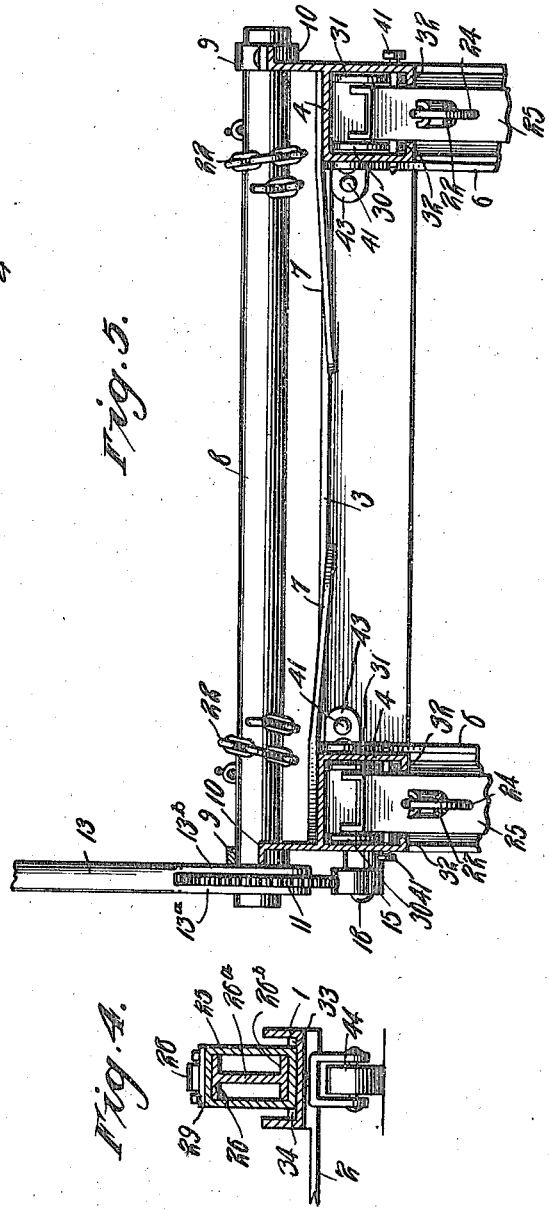
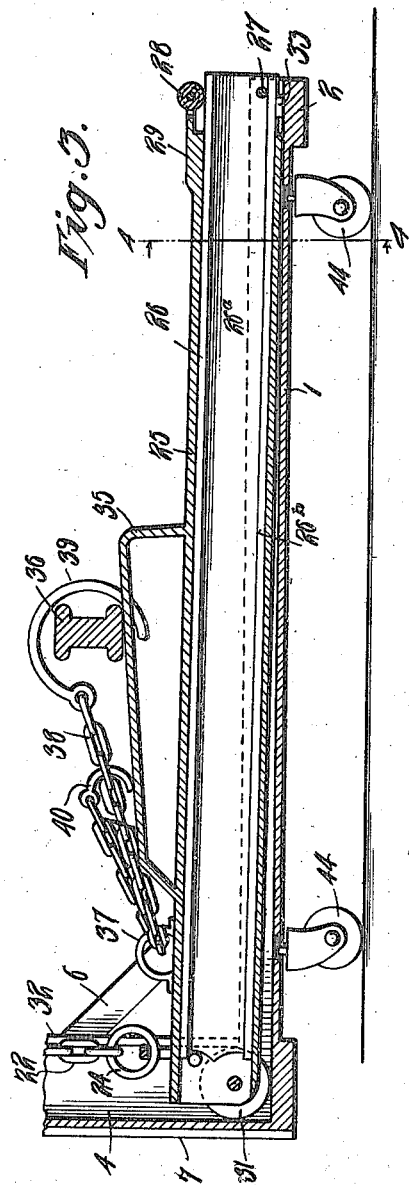
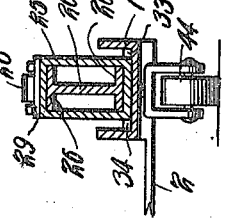
WITNESSES
INVENTOR
A. C. Klemme
BY
ATTORNEY

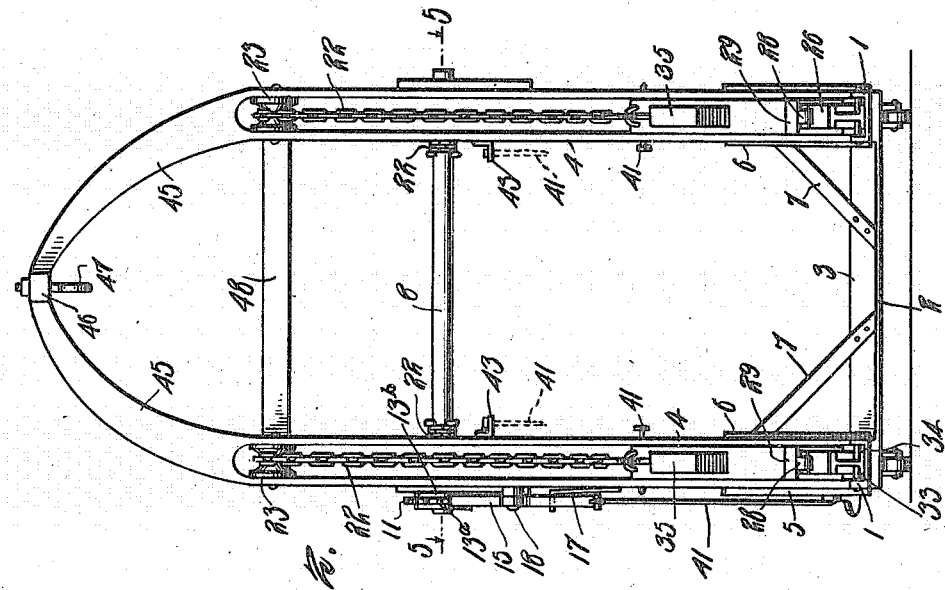

UNITED STATES PATENT OFFICE.

AL C. KLEMME, OF LEWISTOWN, MONTANA.

AUTOMOBILE-HOIST.

1,233,793.  Specification of Letters Patent.  Patented July 17, 1917.

Application filed March 24, 1917. Serial No. 157,181.

*To all whom it may concern:*

Be it known that I, AL C. KLEMME, a citizen of the United States, residing at Lewistown, in the county of Fergus and State of Montana, have invented certain new and useful Improvements in Automobile-Hoists, of which the following is a specification.

This invention relates to automobile hoists, and more particularly to a hoist specially adapted for lifting an automobile a considerable distance above the ground so as to permit easy access to the running gear and other parts of the machinery.

One of the main objects of the invention is to provide a hoist of the character stated of simple and durable construction which can be quickly and easily moved into any desired position and attached to an automobile for the purpose stated. A further object is to provide a hoist which, when not in use, may be partially folded so as to occupy a minimum of space. Another object is to provide simple and efficient means for raising a vehicle to which the hoist is attached and for positively maintaining it in raised position. Further objects will appear from the detailed description.

In the drawings:—

Figure 1 is a side view of a hoist constructed in accordance with my invention.

Fig. 2 is a front view of the same,

Fig. 3 is a section on line 3—3 of Fig. 1,

Fig. 4 is a section on line 4—4 of Fig. 1,

Fig. 5 is a section taken through the standards on line 5—5 of Fig. 2 showing the mounting of the shaft for raising the supporting bars, the supporting bars together with the base bars and associated parts of the frame being omitted for the sake of clearness.

Broadly stated, the hoist comprises a rigid rectangular frame composed of channel base bars and standards secured thereto, and telescoping lifting bars slidable in the standards at one end and hingedly secured to the base bars at the other end, means being provided on the standards and connected to the lifting bars for elevating or raising the same. The base bars 1 of channel construction are secured in spaced parallel relation by the cross brace 2 secured to the front ends of these bars, and angle-iron cross brace 3 secured to the rearward ends of the base bars. Angle-iron 3 is formed integral with the standards 4 which are secured to the rearward or outer ends of the base bar. The outer end of each bar is considered as that end which is not inserted beneath the automobile when the hoist is in use, the inner end being that end which is inserted beneath the vehicle, this terminology being used to avoid confusion. The standards 4 are of channel construction, the inner faces of these standards being open, and are reinforced by the inclined brace bars 5 and 6, and 7 secured to the base bars and the standard and to the standards and the angle bar 3, respectively.

A transverse shaft 8 is rotatably supported on the standards 4 in bearing straps 9 secured on angle brackets 10 which are rigidly secured to the standards. A ratchet wheel 11 is secured on one end of shaft 8. This ratchet wheel is adapted to be engaged by a dog 12 which is pivotally mounted at its outer end in the operating lever 13, and is normally pressed into engagement with the ratchet wheel by the leaf spring 14 in engagement therewith and secured to the lever 13 at its outer end. A latch-lever 15 is pivoted on standard 4 and its upper end turned in as at 16 so as to engage the ratchet wheel 11 when the latch is in operative position. A wire spring 17 is secured to the standard 4 and engages latch-lever 15 below the pivot pin 18 thereof so as to normally hold the upper end of the latch rocked outward thus locking the shaft 8 against rotation in a clockwise direction. A foot lever 19 is pivotally mounted at its inner end on the inclined brace 5, as at 20, and is loosely connected by a rod 21 to the lower end of latch-lever 15. The inner end portion of operating lever 13 is bifurcated to provide two spaced parallel arms 13ª and 13ᵇ. These two arms straddle ratchet wheel 11 so as to provide a rockable mounting for the lever on shaft 8 and maintain the lever in such position as to insure proper engagement of dog 12 with the ratchet wheel. When the lever 13 is rocked downward the dog 12 is in engagement with the ratchet wheel 11 so that the shaft 8 will be rotated. By this means intermittent rotation is imparted to the lifting shaft.

A lifting chain 22 is fixedly secured to shaft 8 near each standard 4. This chain is passed over a guide pulley 23 mounted in the standard adjacent the upper end thereof. The inner end of chain 22 is secured through an eye 24 carried by a rectangular sleeve 25, adjacent the outer end thereof.

This sleeve 25 corresponds in exterior width to the interior width of the base bar 1. Sleeve 25 snugly receives an I-beam 26 which is hingedly secured at its inner end to the inner end of channel bar 1 by a pintle 27 passed through the vertical walls of the base bar and the web portion 26ᵃ of beam 26. This pintle is so positioned as to permit the I-beam to be moved downward into parallelism with base bar 1.

An anti-friction roller 28 is mounted in a bracket 29 secured to sleeve 25 at the lower end thereof. This roller extends somewhat beyond the lower end of the sleeve and engages the top of I-beam 26 so as to provide a roller bearing for the sleeve during its movement on the beam thus reducing friction to a minimum.

The sleeve 25 is of slightly less length than the I-beam 26, and the I-beam 26 is of approximately the same length as channel bar 1. By this construction, the lifting bar which is composed of I-beam 26 and sleeve 25 may be folded downward into a horizontal position so as to fit into the channel base bar 1 as indicated in Fig. 3 of the drawings. When thus folded, the lifting bar occupies a minimum of space, the hoist consisting for all practical purposes of a rectangular frame composed of the base bars and the standard which may be stored in a very small space.

Each of the sleeves 25 is provided at its outer end with anti-friction rollers 30 and 31 mounted at each side of the sleeve. These rollers engage between the outer wall of the standard 4 and the inwardly directed flange 32 formed at the inner edge of each side arm of the standard. These rollers coöperate with roller 28 to provide an anti-friction mounting for the sleeve 25 and also serve to positively prevent inward movement of the sleeve relative to the standard, rollers 30 and 31 being confined between the outer wall of the standard and the flanges 32, as above stated. These rollers also insure accurate operation of the sleeve during its vertical movement so as to eliminate binding of the same in the standard. For the same purpose, the I-beam 26 is provided at its outer end with laterally extending ears 33 and 34 formed integral with the base flange 26ᵇ. These ears are of such length as to engage snugly the vertical arms of the channel base bar 1 thus preventing lateral movement of the I-beam in the base bar. This insures that the I-beam will be maintained in proper position relative to the sleeve 25 thus eliminating all possibility of binding between these two members.

Each of the sleeves 25 is provided, intermediate its ends on its upper face, with an approximately rectangular axle supporting bracket 35. This bracket may be formed integral with the sleeve, as shown, or may be made separate and secured to the sleeve, as desired. The brackets 35 are adapted to support the axle 36 of the vehicle to be raised. Each sleeve 25 is further provided with an eye 37 adjacent the outer end of bracket 35. This eye is adapted to receive a chain 38 which is provided at one end with a hook 39 adapted to engage over the axle 36 as shown in Fig. 1 of the drawings. Chain 38 is provided at its other end with a hook 40 adapted to be inserted through any one of the links of the chain, selectively, thus securing the chain through eye 37.

In using this hoist, it is moved into such position as to have the base bars 1 extending beneath the axle of the automobile, the lifting bars composed of sleeves 25 and the beams 26 being in normal or lowered position. After the hoist has been placed in proper position relative to the vehicle, the shaft 8 is rotated by means of lever 13 so as to raise the lifting bars and bring the axle supporting brackets 35 into engagement with the underface of the axle 36. After that has been done, chains 38 are secured through eye 37, hooks 39 being placed over the axle. When the axle has thus been secured to the sleeves 25, the shaft 8 is again rotated so as to wind the lift chains 22 onto the same thus lifting the axle, and consequently the forward portion of the vehicle, it being assumed that 36 is the front axle. During this lifting operation, the vehicle will be moved slightly forward so as to be maintained in proper relation to the hoist, as will be obvious. When the vehicle has been elevated or raised into the desired position, suitable locking pins 41 may be inserted through any one of the spaced apertures 42 provided in the side arms of the standards 4, these apertures being disposed in pairs in alinement transversely of the standards, and the pin being inserted in the pair of apertures immediately beneath the outer end of sleeve 25. The pins 41 thus act to positively lock the vehicle in raised position thus eliminating all danger of injury either to the vehicle or the hoist due to accidental disengagement of the latch-lever 15 from the ratchet wheel 11. For convenience, the locking pins 41 may be normally held in angle brackets 43 secured to the standards 4 so as to be readily accessible.

For convenience in handling, the hoist may be provided with suitable casters 44 mounted on the base beams 1 in the usual manner.

In addition to the hoisting means just described, I also provide means whereby, when it is desired to raise the vehicle to an unusual height, a block and tackle may be used in place of the lifting means described. For this purpose each standard 4 is arched inward at its upper end to form an arm 45.

These two arms are integrally united at their upper ends by a supporting sleeve 46, this sleeve being positioned substantially in vertical alinement with the center of the base of the hoist, the arms 45 and sleeve 46 constituting in effect a crane carried by the standards 4. Sleeve 46 is adapted to receive an eye-bolt 47. When desired, a block and tackle, or other suitable lifting means, may be secured to eye 47 so as to permit a vehicle, or other object, to be raised in the usual manner. Of course, a device of this sort could be used in conjunction with the lifting means previously described, the article being first elevated in the usual manner, after which it may be lifted or, if desired, secured in raised position, by means of the crane and eye bolt and any other suitable device adapted to coöperate with the same for this purpose. To prevent spreading of the upper ends of standards 4 when using the crane or lifting heavy vehicles, a suitable brace bar 48 is secured to these standards adjacent the upper ends thereof.

What I claim is:—

1. In hoists, a frame comprising two base bars mounted in parallel spaced relation and two standards carried thereby, beams hingedly secured at their inner ends to the inner end of each base bar, sleeves slidable on said beams, means carried by said sleeves and engaging said standards for preventing longitudinal movement of the sleeves in either direction, and means for raising the outer ends of said sleeves.

2. In hoists, a frame comprising two base bars mounted in spaced parallel relation and two standards of channel construction each of said standards being provided with an inwardly directed flange at the inner edge of each side wall, beams hingedly secured at their inner ends to the inner ends of each base bar, sleeves slidable on each beam and operable in said standards, rollers mounted on the outer end of each sleeve at the sides thereof and confined between the outer wall of the standard and said flanges whereby said rollers provide an antifriction mounting for the outer ends of the sleeves and positively prevent inward movement of the same relative to the standards, and means for raising the outer ends of said sleeves.

3. In hoists, a frame comprising two channel base bars mounted in spaced parallel relation and two standards of channel construction communicating with each base bar at the outer end thereof, beams hingedly secured at their inner ends to the inner end of each base bar, sleeves slidable on said beams and having their outer ends operable in the standards, said beams being of greater length than said sleeves and of approximately the same length as the base bars, and said sleeves being of approximately the same exterior width as the interior width of said base bars so as fit into the same when in lowered position, and means for raising the outer ends of said sleeves.

4. In hoists, a frame comprising two channel base bars mounted in spaced parallel relation and two standards of channel construction communicating with each base bar at the outer end thereof, beams hingedly secured at their inner ends to the inner end of each base bar, sleeves slidable on said beams and having their outer ends operable in the standards, guide pulleys mounted in each standard adjacent the upper end thereof, a transverse shaft rotatably mounted on said standards, chains passed over said pulleys and secured to each of said sleeves adjacent the outer ends thereof, the outer ends of the chains being secured to said shaft, means for rotating the shaft so as to wind the chains thereon, and means for preventing reverse rotation of said shaft.

In testimony whereof I affix my signature in presence of two witnesses.

AL C. KLEMME.

Witnesses:
MABEL NEWBURY,
S. P. WILLIAMS.